US007779862B2

(12) United States Patent
Sanderson et al.

(10) Patent No.: US 7,779,862 B2
(45) Date of Patent: Aug. 24, 2010

(54) RESERVOIR ASSEMBLY

(75) Inventors: Rod M. Sanderson, Midland, MI (US);
Jason T. Rutkiewicz, Saginaw, MI (US);
Steven J. Schultz, Saginaw, MI (US);
Roy W. Heath, Midland, MI (US);
Martin P. Sheridan, Saginaw, MI (US);
Albert Cheuk-Yin Wong, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 392 days.

(21) Appl. No.: 11/495,798

(22) Filed: Jul. 28, 2006

(65) Prior Publication Data
US 2007/0028968 A1     Feb. 8, 2007

Related U.S. Application Data

(60) Provisional application No. 60/705,614, filed on Aug. 4, 2005.

(51) Int. Cl.
*F16K 24/00*     (2006.01)
(52) U.S. Cl. .................... 137/574; 220/555; 220/563; 137/573
(58) Field of Classification Search ............. 137/573, 137/574; 251/367; 220/563, 564, 555, 4.12
See application file for complete search history.

(56) References Cited

U.S. PATENT DOCUMENTS

| | | | | | |
|---|---|---|---|---|---|
| 1,462,347 | A | * | 7/1923 | Kramer | 220/563 |
| 1,616,008 | A | * | 2/1927 | Stout | 220/563 |
| 2,806,622 | A | * | 9/1957 | Leirer | 220/4.14 |
| 3,642,086 | A | * | 2/1972 | Andrews | 180/306 |
| 4,170,877 | A | * | 10/1979 | Pickering | 137/574 |
| 4,210,176 | A | * | 7/1980 | Emming | 137/573 |
| 4,297,846 | A | * | 11/1981 | Cadeddu | 60/585 |
| 4,355,512 | A | * | 10/1982 | Kubota et al. | 60/534 |
| 4,844,278 | A | * | 7/1989 | Freiwald et al. | 220/563 |
| 5,356,535 | A | * | 10/1994 | Ueno et al. | 137/574 |
| 5,398,839 | A | * | 3/1995 | Kleyn | 220/560.03 |
| 5,718,281 | A | | 2/1998 | Bartalone et al. | |
| 6,105,611 | A | * | 8/2000 | Ando et al. | 137/558 |
| 6,138,859 | A | | 10/2000 | Aulph et al. | |
| 2005/0092375 | A1 | | 5/2005 | Kim | |

FOREIGN PATENT DOCUMENTS

| | | |
|---|---|---|
| EP | 0413609 | 2/1991 |
| EP | 1099614 | 5/2001 |

* cited by examiner

*Primary Examiner*—Stephen Hepperle
*Assistant Examiner*—Andrew J Rost
(74) *Attorney, Agent, or Firm*—Cantor Colburn LLP

(57) ABSTRACT

A reservoir assembly for retaining a fluid includes a body having a base and external side walls defining a cavity. A baffle has a top surface spanning the cavity and includes a peripheral wall substantially conforming to the external side walls and extending to the base. A lid is connected to the body. The cavity is divided into a first, second and third compartment by a cooperation between the top surface of the baffle, a plurality of walls of the baffle, the base of the body and the external side walls of the body. The first and second compartments are in fluid communication with each other through the third compartment. An inlet port and an outlet port for allowing fluid to enter and exit the cavity are fluidly connected to the body and are fluidly connected to each other by the first compartment to direct a flow of the fluid.

11 Claims, 6 Drawing Sheets

RESERVOIR ASSEMBLY

CROSS REFERENCE TO RELATED APPLICATION

This application claims the benefit of U.S. Provisional Patent Application Ser. No. 60/705,614 filed Aug. 4, 2005.

BACKGROUND OF THE INVENTION

1. Field of the Invention

The present invention relates to a reservoir assembly for retaining a fluid.

2. Description of the Prior Art

Reservoir assemblies are commonly used in a number of applications to retain a fluid. In one application, such as a vehicle power steering system, a reservoir assembly is used to hold a pre-determined quantity of a hydraulic fluid. Typically the reservoir assembly includes an outlet port for communicating the hydraulic fluid to a power steering pump and an inlet port that permits the return of the hydraulic fluid from the power steering gear. Reservoir assemblies commonly use baffles to help control fluid dynamics such as aeration, sloshing or air flow anomalies that can result from vehicle maneuvers such as turning, stopping and acceleration. A common solution to these problems involves ensuring that the outlet port and inlet port are constantly immersed in the hydraulic fluid by including a supply of the hydraulic fluid in the reservoir assembly deep enough to cover the ports under all circumstances. This can require a larger volume of fluid, and consequently a larger reservoir assembly than is practical in many applications. An example of such an assembly is disclosed in U.S. patent application Ser. No. 2005/0092375 A1 to Kim. The reservoir has a plurality of inner walls for creating compartments within a cavity. An upper compartment for retaining the hydraulic fluid extends well above the lower compartments housing the inlet port and the outlet port.

Although there are numerous examples of reservoirs, these examples do not address applications where packaging must be compact because of limitations in space while not compromising performance. An opportunity exists to provide an effective and efficient fluid reservoir which uses smaller packaging, uses less fluid, and is practical to manufacture.

SUMMARY OF THE INVENTION AND ADVANTAGES

The present invention provides a reservoir assembly for retaining a fluid having a body with a base and plurality of interconnected external side walls extending from the base for defining a cavity. An inlet port is fluidly connected to the body for allowing the fluid to enter the cavity. An outlet port is fluidly connected to the body for allowing the fluid to exit the cavity. A baffle is disposed within the cavity. The baffle has a top surface and a plurality of walls extending from the top surface. The plurality of walls of the baffle include a continuous peripheral wall substantially conforming to the external side walls and extending to the base of the body for preventing air from entering a portion of the cavity.

Although there are numerous examples of reservoir assemblies, the subject invention provides a reservoir assembly with increased fluid management efficiency which allows compact packaging and requires a smaller volume of fluid, being particularly useful where there are space limitations. The cooperation between the body and baffle allow compact packaging while creating substantially air impervious compartments to prevent air from entering the outlet port.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
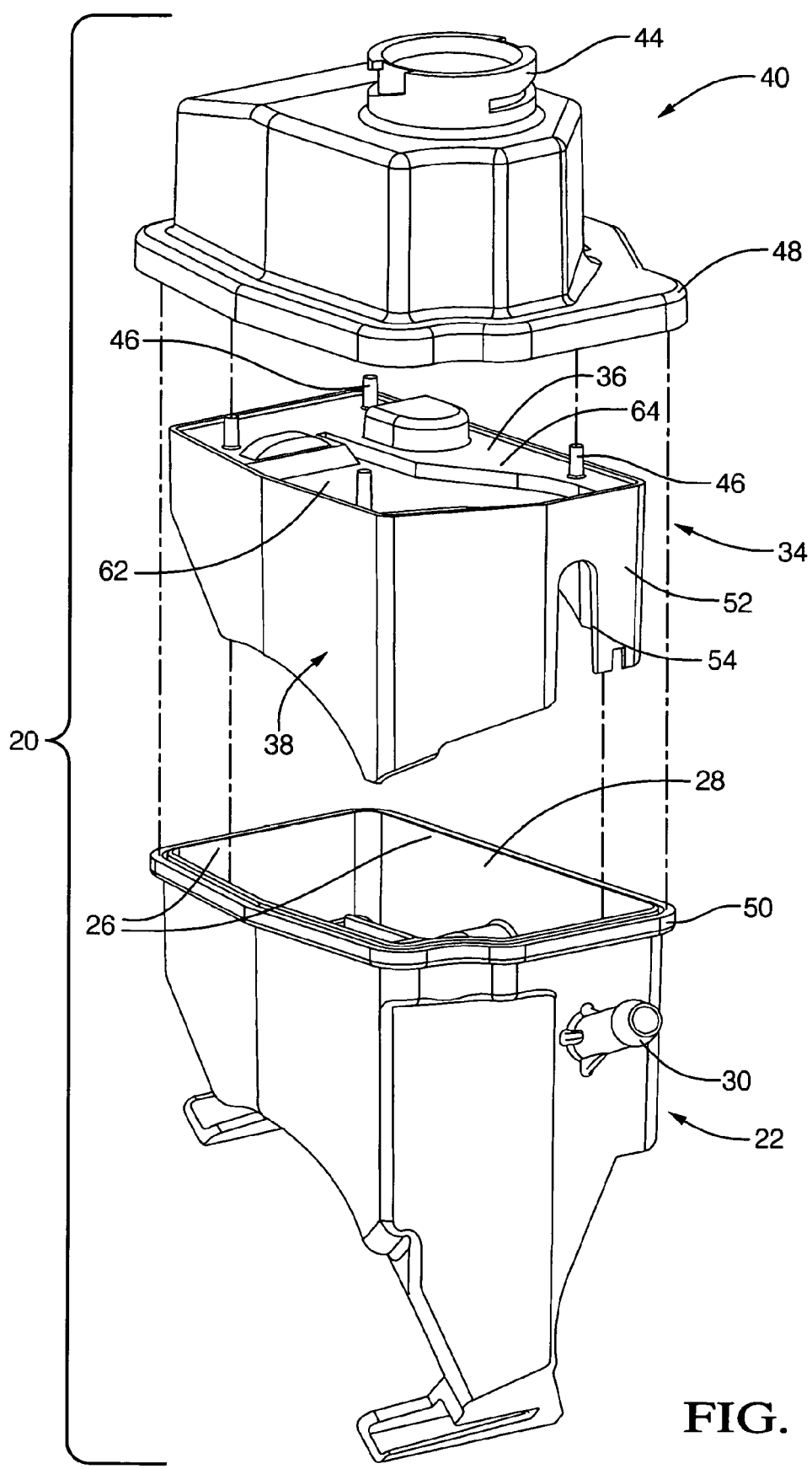
FIG. 1 is an exploded perspective view of a reservoir assembly illustrating a body, a baffle and a lid.

Referring to the Figures, wherein like numerals indicate corresponding parts throughout the several views, a reservoir assembly 20 for retaining a fluid is generally shown in FIG. 1. The reservoir assembly 20 includes a body 22 defining a cavity 28. The assembly 20 also includes a baffle 34 disposed within the cavity 28. The baffle 34 includes a top surface 36 extending across the cavity 28 and a plurality of walls 38 extending from the top surface 36. The top surface 36 of the baffle 34 includes a plurality of pins 46 extending from the top surface 36. Finally, the assembly 20 includes a lid 40 which is engageable with the body 22 and the baffle 34 to close the cavity 28.

Figure 2:
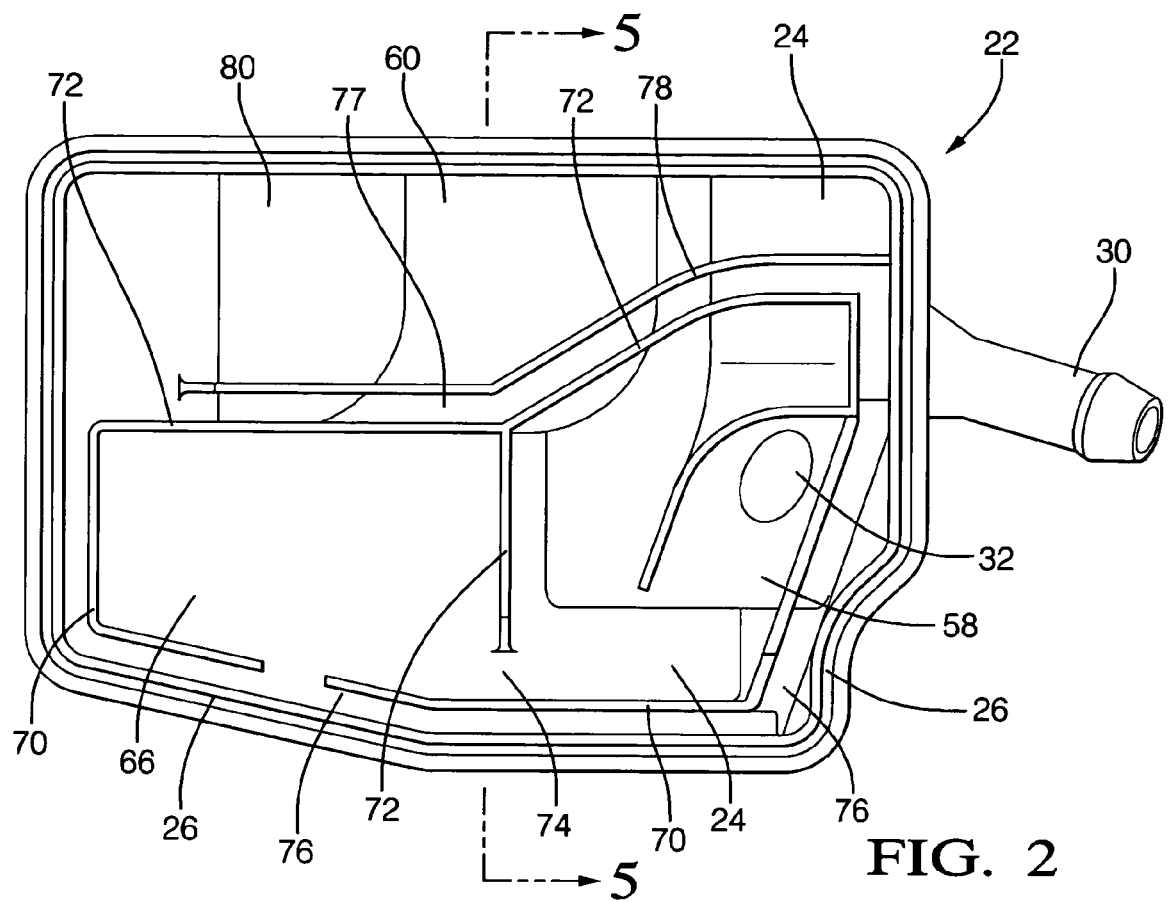
FIG. 2 is a top planar view of the body.
Figure 5:
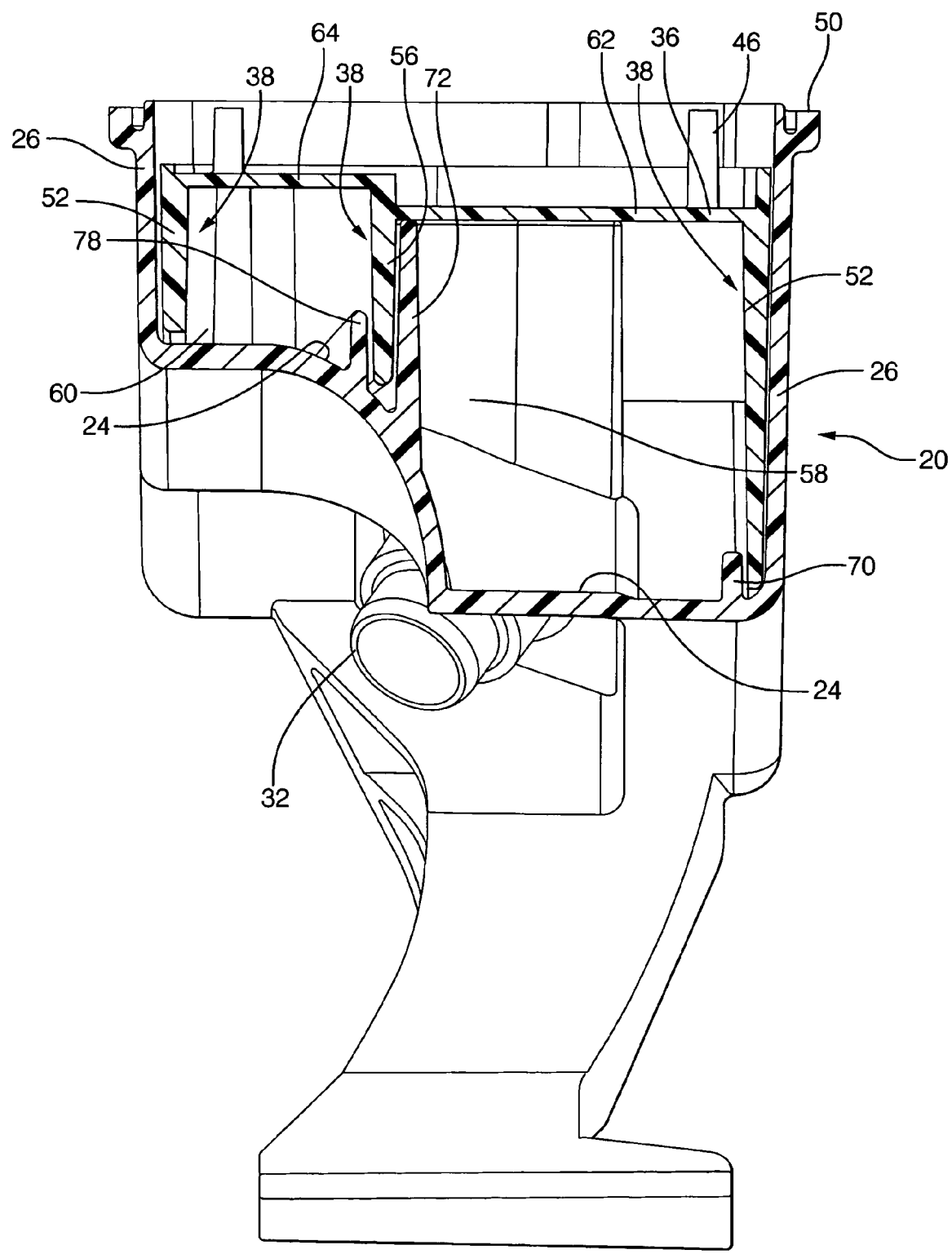
FIG. 5 is a cross-sectional side view of the body taken along line 5—5 in FIG. 2 with the baffle disposed therein.

Referring to FIGS. 1, 2, and 5, the body 22 has a base 24 and a plurality of interconnected external side walls 26 extending from the base 24 for defining the cavity 28. An inlet port 30 is fluidly connected to the body 22 for allowing the fluid to enter the cavity 28. An outlet port 32 is fluidly connected to the body 22 for allowing the fluid to exit the cavity 28. In the preferred embodiment, the inlet port 30 is mounted to one of the external side walls 26 and the outlet port 13 is mounted to the base 24. It can be readily appreciated that the ports 30, 32 can be constructed in any suitable manner.

The lid 40 includes a filler neck 44 which extends away from the lid 40 for introducing the fluid into the cavity 28. The filler neck is closed by a cap (not shown) which permits air to enter and exit the cavity 28 in response to changes in temperature and pressure. As discussed in greater detail below, the baffle 34 and the body 22 have unique configurations for allowing the passage of air through the cap while preventing air from interfering with the flow of the fluid. The pins 46 of the baffle 34 abut the lid 40 for applying pressure against the baffle 34 to retain the baffle 34 in the body 22. The lid 40 includes a flange 48 and the body 22 includes a shoulder 50 for engaging the flange 48. It can be appreciated that the outside shape of the body 22 and lid 40 can take on many forms as required by a specific application. Further, the lid 40, the body 22 and the baffle 34 can be made of materials different from each other and can be produced by different processes.

Referring to FIGS. 2 and 5, the base 24 includes a plurality of projections 70 extending upwardly from the base 24 within the cavity 28. An inner partition wall 72 extends upwardly from the base 24 toward the top surface 36 of the baffle 34 dividing the cavity 28 into at least a first compartment 58 and a second compartment 60. Preferably, the inner partition wall 72 divides the cavity 28 into first 58, second 60, and third 66 compartments. The inner partition wall 72 is illustrated as have an irregular shape, and it can be readily appreciated that the shape of the inner partition wall 72 can vary depending on the number and shape of the compartments 58, 60, 66 desired for a specific application.

The inner partition wall 72 is spaced from the external side walls 26 to define a plurality of gaps 74 for fluidly connecting compartments 58, 60, 66 within the cavity 28 for controlling the flow of fluid. Preferably the inner partition wall 72 is spaced from the projections 70 to define the gaps 74. It can be appreciated that the gaps 74 can vary in size and shape depending on the requirements of the specific application. The compartments 58, 60, 66 and fluid flow will be discussed later in detail.

The projections 70 are preferably in spaced relationship with at least a portion of the external side walls 26 of the body 22 for defining a first channel 76. The base 24 also includes and an interior leg 78 extending upwardly from the base 24 toward the top surface 36 of the baffle 34 in spaced relationship with at least a portion of the inner partition wall 72 for defining a second channel 77.

Referring to FIGS. 1 and 3–5, the plurality of walls 38 of the baffle 34 include a continuous peripheral wall 52 substantially conforming to the external side walls 26 and extending to the base 24 to create a substantially air impermeable surface for preventing air from entering a portion of the cavity 28. The peripheral wall 52 includes a port cut-out 54 to allow for insertion of the baffle 34 about the inlet port 30. It can be appreciated that the peripheral wall 52 can comprise many shapes depending on the shape of the external side walls 26.

The plurality of walls 38 of the baffle 34 also include an interior wall 56 extending to the base. The interior wall 56 of the baffle 34 substantially conforms to at least a portion of the inner partition wall 72 for further preventing air from passing between the compartments 58, 60, 66. It can be appreciated that the shape of the interior wall 56 can vary depending on the requirements of the application.

Figure 3:
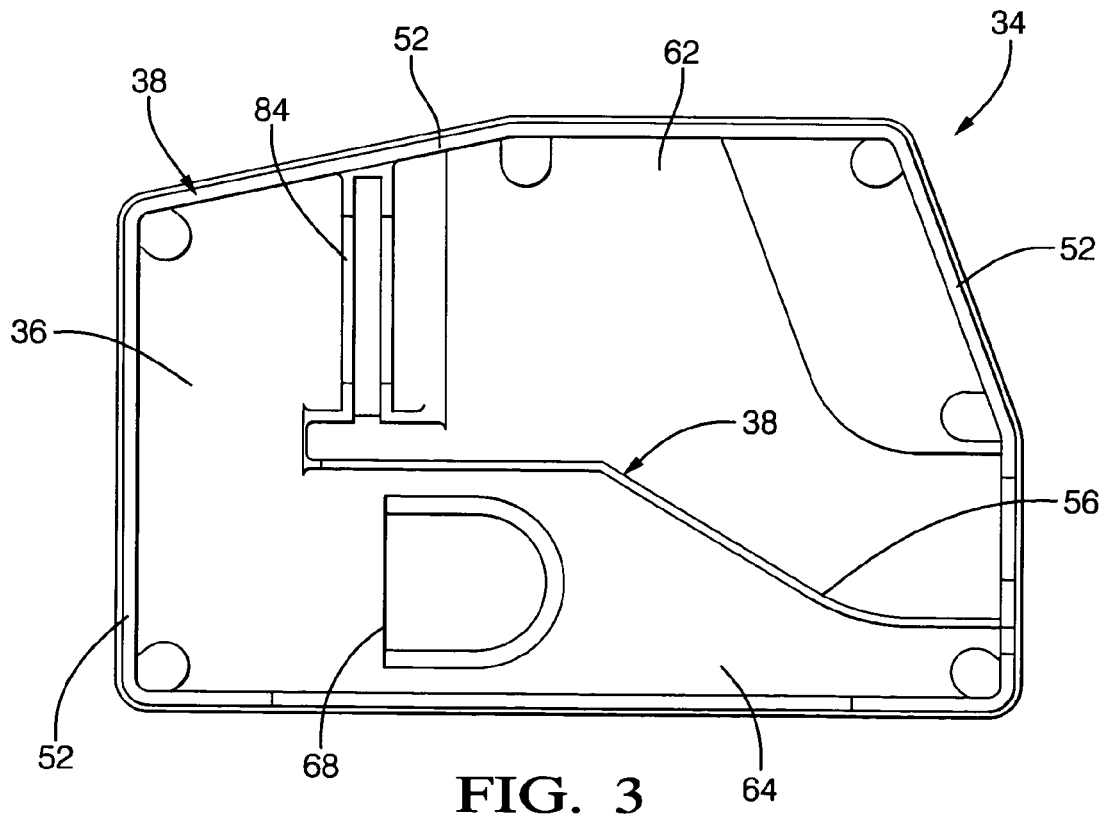
FIG. 3 is a bottom planar view of the baffle.
Figure 4:
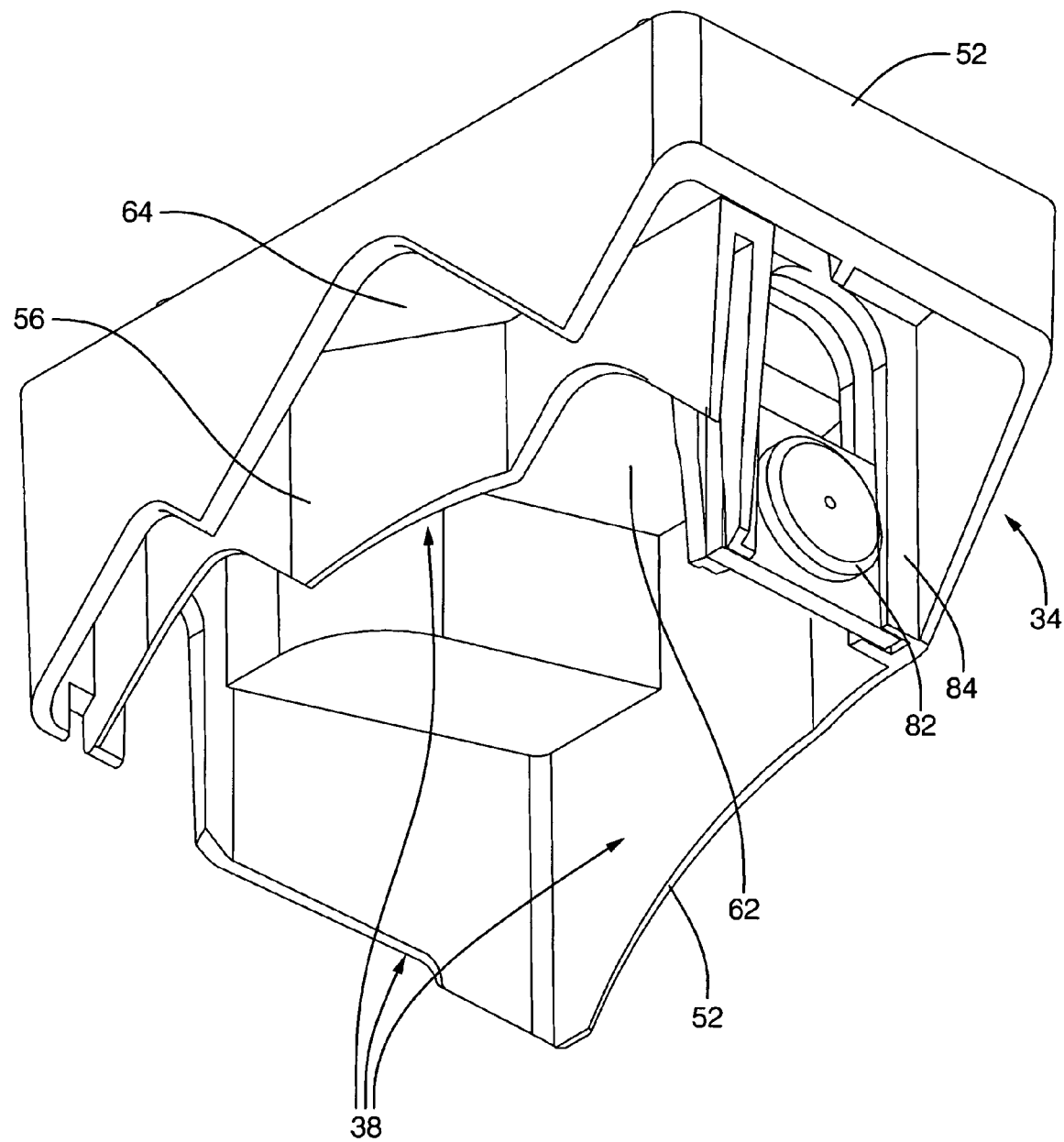
FIG. 4 is a bottom perspective view of the baffle.

As best shown in FIGS. 3 and 5, the top surface 36 of the baffle 34 includes a first portion 62 and a second portion 64 defined by the interior wall 56. The first portion 62 is continuous and uninterrupted across the first compartment 58 and a portion of the third compartment 66 for preventing air from entering the first compartment 58 and the third compartment 66. The second portion 64 of the top surface 36 extends across the second compartment 60 and includes an aperture 68 for introducing the fluid into the second compartment 60.

The peripheral wall 52 of the baffle 34 is inserted into the first channel 76 for preventing air from entering the first and third compartments 58, 66. Similarly, the interior wall 56 of the baffle 34 is inserted into the second channel 77 for further preventing air from entering the first and third compartments 58, 66.

As previously discussed, as a result of a cooperation between the baffle 34 and the base 24, the cavity 28 is divided into compartments 58, 60, 66. Preferably, the first compartment 58 is defined by the base 24, the projection 70, a portion of the external side walls 26, a portion of the peripheral wall 52 of the baffle 34, the top surface of the baffle 34, the inner partition wall 72, and the interior wall 56. It can be readily appreciated that the surfaces that define the first compartment 58 can vary depending upon the requirements of the application. The first portion 62 of the top surface 36 of the baffle 34 extends continuously and uninterrupted across the first compartment 58 to prevent air from entering the first compartment 58. The first compartment 58 fluidly connects the outlet port 32 and inlet port 30 for directing a flow of fluid through this portion of the cavity 28. The first compartment 58 preferably has an irregular shape that directs the flow of fluid in a curved path between the inlet port 30 and the outlet port 32. The inlet port 30 is illustrated as being generally higher than the outlet port 32 for facilitating a downward flow of the fluid for facilitating immersion of the outlet port 32 in the fluid to prevent air from entering the outlet port 32.

The second compartment 60 is defined by the base 24, a portion of the external side walls 26, the interior partition wall 72, the interior wall 56, the interior leg 78, a portion of the peripheral wall 52, and the top surface 36 of the baffle 34. It can be readily appreciated that the surfaces that define the second compartment 60 can vary depending upon the requirements of the application. The second compartment 60 includes a recess 80 for retaining a portion of the fluid. The second compartment 60 is fluidly connected to the lid 40 by the aperture 68 defined in the top surface 36 of the baffle 34. The aperture 68 permits fluid to be introduced into this portion of the cavity 28.

A third compartment 66 is defined by the base 24, the projection 70, a portion of the external side walls 26, a portion of the peripheral wall 52 of the baffle 34, the inner partition wall 72, the top surface 36 of the baffle 34 and the interior wall 56 of the baffle 34. It can be readily appreciated that the surfaces that define the third compartment 66 can vary depending upon the requirements of the application. The top surface 36 of the baffle 34 is continuous and uninterrupted and extends across at least a portion of the third compartment 66 as well as the first compartment 58 as previously discussed. A filter 82 is coupled to the baffle 34 by a filter bracket 84 and is disposed within the third compartment 66 for removing contaminants from the fluid.

The first and second compartments 58, 60 are fluidly connected to each other solely through the third compartment 66. The interrelationship between the baffle 34 and body 22 and the compartments 58, 60, 66 created within the cavity 28 substantially prevents any opportunity for air to enter the outlet port 32. The cooperation between the external side walls 26 and the peripheral wall of the baffle 34 create tortuous paths that air must penetrate in order to enter any of the compartments 58, 60, 66.

Figure 6:
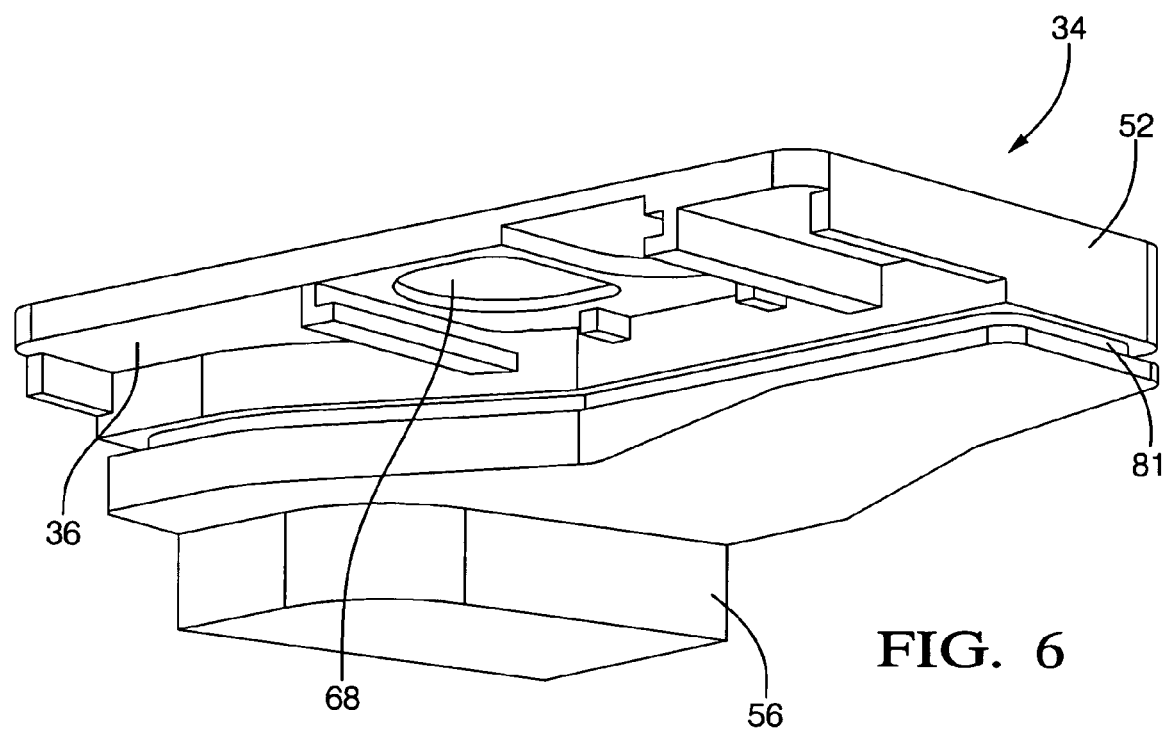
FIG. 6 is a bottom perspective view of an alternative embodiment of the baffle.
Figure 7:
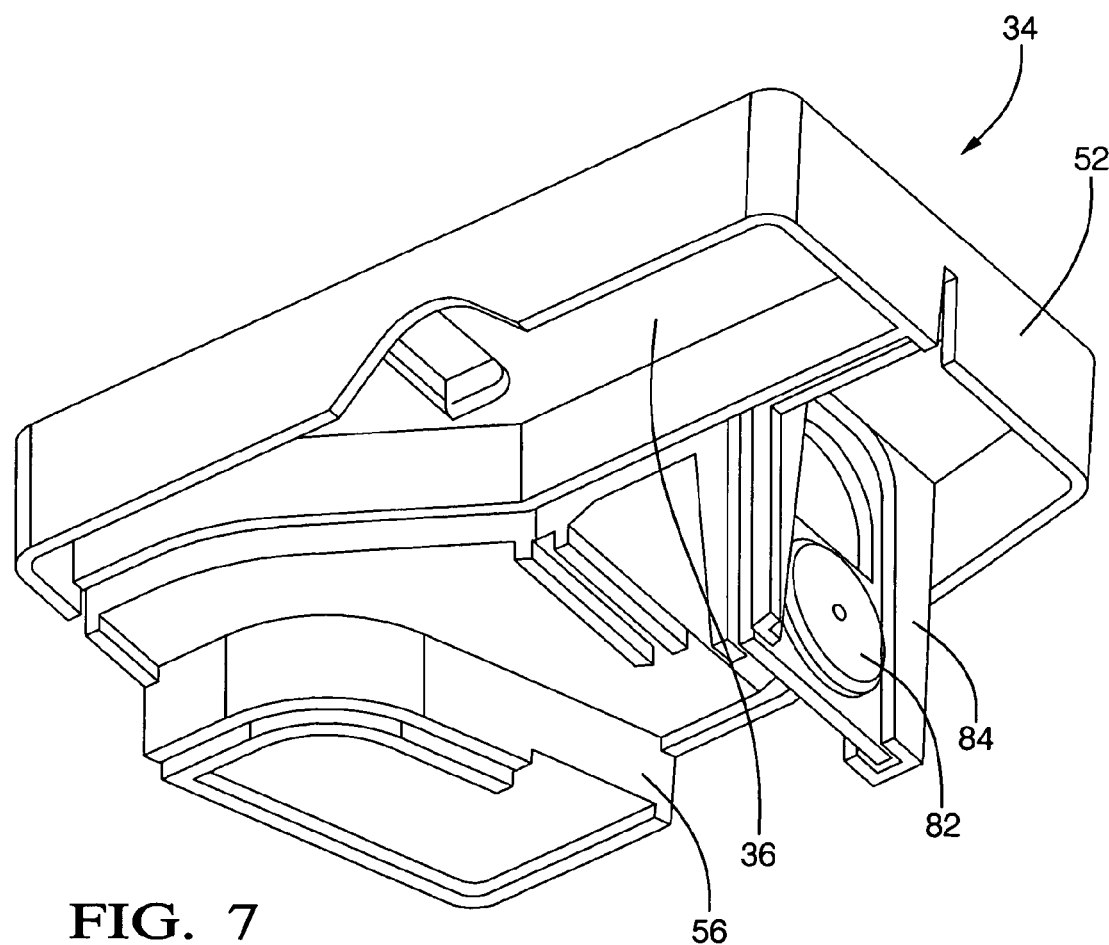
FIG. 7 is a bottom perspective view of yet another alternative embodiment of the baffle.
Figure 8:
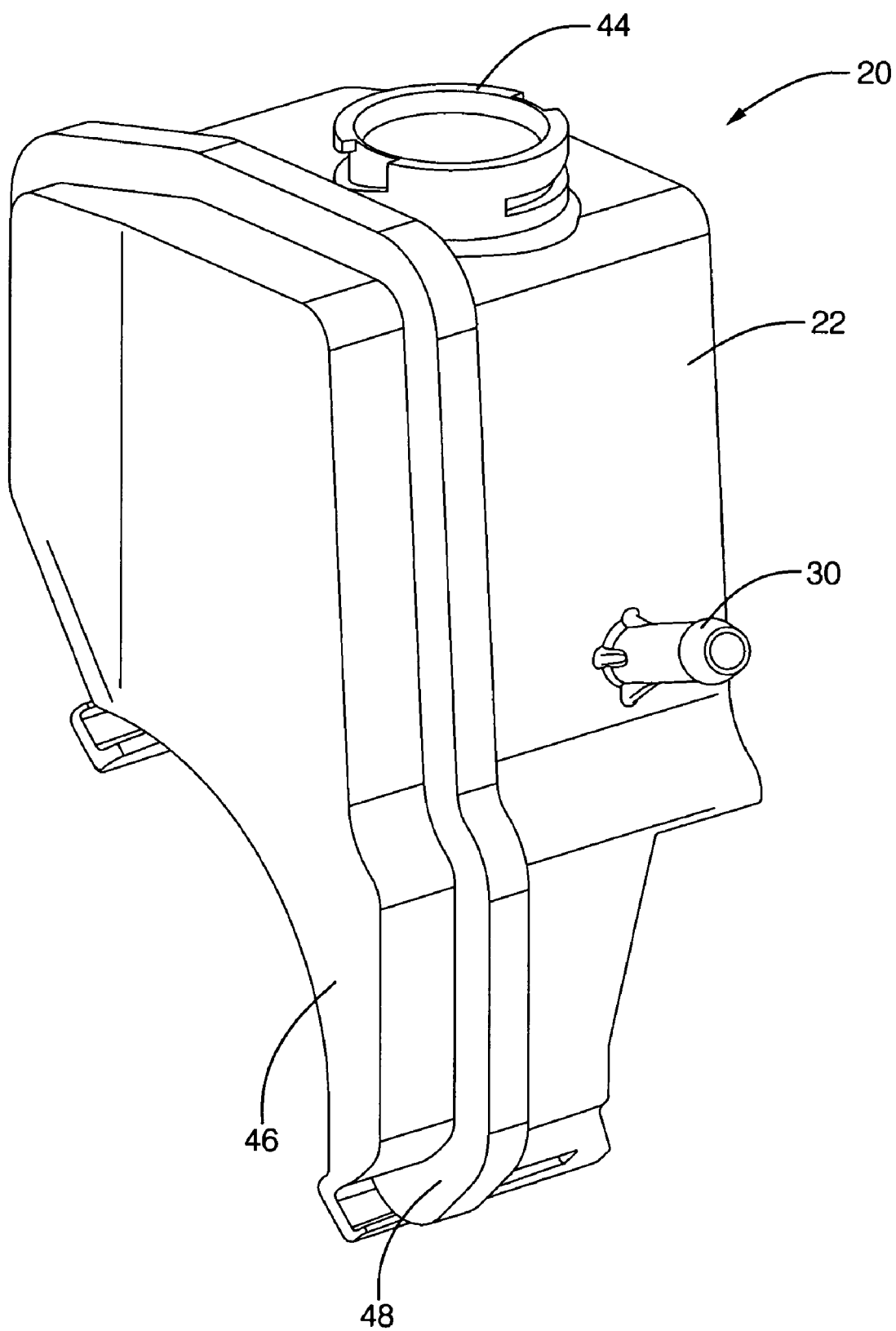
FIG. 8 is a side perspective view of an alternative embodiment of the reservoir assembly.

Referring to FIG. 6, an alternative embodiment of the baffle 34 is illustrated including a groove 81 for receiving a seal (not shown). The seal would be disposed between the baffle 34 and body 22, and would replace the need for some of the plurality of walls 38 within the cavity 28. Referring to FIG. 7, another embodiment of the baffle 34 is illustrated with the peripheral walls 52 being modified to accomplish a press-fit with the body 22 for further reducing the entry of air into the cavity 28. Referring to FIG. 8, an alternative embodiment of the reservoir assembly 20 is illustrated including the baffle 34 and the lid 40 constructed as a single integral part with the body 22 including the filler neck 44.

What is claimed is:

1. A reservoir assembly for retaining a fluid, said assembly comprising:

a body having a base and plurality of interconnected external side walls extending from said base for defining a cavity;

an inlet port fluidly connected to said body for allowing the fluid to enter said cavity;

an outlet port fluidly connected to said body for allowing the fluid to exit said cavity;

a baffle disposed within said cavity with said baffle having a top surface and a plurality of walls extending from said top surface, said plurality of walls of said baffle including a continuous peripheral wall substantially conforming to said external side walls and extending to said base of said body for preventing air from entering a portion of said cavity and including an interior wall substantially conforming to at least a portion of an inner partition wall and extending to said base for preventing air from passing between said compartments;

said base including said inner partition wall extending upwardly from said base toward said baffle for dividing said cavity into at least a first compartment and a second compartment; and said base including an interior leg extending upwardly from said base toward said baffle in spaced relationship with at least a portion of said inner partition wall for defining a first channel for receiving said interior wall of said baffle to further prevent air from passing between said compartments.

2. An assembly as set forth in claim 1 wherein said base includes at least one projection extending upwardly from said base toward said baffle in spaced relationship with at least a portion of said external side walls of said body for defining a second channel to receive a portion of said peripheral wall of said baffle for preventing air from entering a portion of said cavity.

3. An assembly as set forth in claim 1 wherein said first and second compartments are in fluid communication with each other through a third compartment for providing controlled communication of fluid between said first and second compartments.

4. An assembly as set forth in claim 3 wherein said top surface of said baffle includes a first portion and a second portion defined by said interior wall with said first portion being continuous and uninterrupted across said first compartment and said third compartment for preventing air from entering said first compartment and said third compartment.

5. An assembly as set forth in claim 3 including a filter coupled to said baffle and disposed within said third compartment for removing contaminants from the fluid.

6. An assembly as set forth in claim 1 wherein said first compartment fluidly connects said inlet port and said outlet port for directing a flow of the fluid.

7. An assembly as set forth in claim 1 including a lid engageable with said body and said baffle for enclosing said cavity.

8. A reservoir assembly for retaining a fluid, said assembly comprising:
 a body having a base and plurality of interconnected external side walls extending from said base for defining a cavity;
 an inlet port fluidly connected to said body for allowing the fluid to enter said cavity;
 an outlet port fluidly connected to said body for allowing the fluid to exit said cavity;
 a baffle disposed within said cavity with said baffle having a top surface and a plurality of walls extending from said top surface, said plurality of walls of said baffle including a continuous peripheral wall substantially conforming to said external side walls and extending to said base of said body for preventing air from entering a portion of said cavity and including an interior wall substantially conforming to at least a portion of an inner partition wall and extending to said base for preventing air from passing between said compartments;
 said base including said inner partition wall extending upwardly from said base toward said baffle for dividing said cavity into at least a first compartment and a second compartment, said first and second compartments are in fluid communication with each other through a third compartment for providing controlled communication of fluid between said first and second compartments;
 said top surface of said baffle including a first portion and a second portion defined by said interior wall with said first portion being continuous and uninterrupted across said first compartment and said third compartment for preventing air from entering said first compartment and said third compartment; and
 said second portion of said top surface extending across said second compartment and including an aperture for introducing the fluid into said second compartment.

9. A reservoir assembly for retaining a fluid, said assembly comprising:
 a body having a base and plurality of interconnected external side walls extending from said base for defining a cavity;
 an inlet port fluidly connected to said body for allowing the fluid to enter said cavity;
 an outlet port fluidly connected to said body for allowing the fluid to exit said cavity;
 a baffle disposed within said cavity with said baffle having a top surface and a plurality of walls extending from said top surface, said plurality of walls of said baffle including a continuous peripheral wall substantially conforming to said external side walls and extending to said base of said body for preventing air from entering a portion of said cavity and including an interior wall substantially conforming to at least a portion of an inner partition wall and extending to said base for preventing air from passing between said compartments;
 said base including said inner partition wall extending upwardly from said base toward said baffle for dividing said cavity into at least a first compartment and a second compartment, said first and second compartments are in fluid communication with each other through a third compartment for providing controlled communication of fluid between said first and second compartments; and
 said inner partition wall is spaced from said external side walls to define a plurality of gaps for fluidly connecting said first compartment to said third compartment and for fluidly connecting said third compartment to said second compartment for controlling a flow of the fluid between said compartments.

10. A reservoir assembly for retaining a fluid, said assembly comprising:
 a body having a base and plurality of interconnected external side walls extending from said base for defining a cavity;
 an inlet port fluidly connected to said body for allowing the fluid to enter said cavity;
 an outlet port fluidly connected to said body for allowing the fluid to exit said cavity;
 a baffle disposed within said cavity with said baffle having a top surface and a plurality of walls extending from said top surface, said plurality of walls of said baffle including a continuous peripheral wall substantially conforming to said external side walls and extending to said base of said body for preventing air from entering a portion of said cavity;
 a lid engageable with said body and said baffle for enclosing said cavity, said lid including a filler neck extending away from and fluidly connected with said lid for introducing the fluid into a portion of said cavity.

11. An assembly as set forth in claim 10 wherein said top surface includes a plurality of pins extending from said top surface abutting said lid for applying pressure against said baffle to retain said baffle in said body.

* * * * *